Nov. 19, 1968   G. I. AXENOV ET AL   3,411,197
METHOD FOR CONTINUOUSLY MANUFACTURING COMMUTATOR SEGMENTS
Filed Nov. 26, 1963   3 Sheets-Sheet 2

INVENTOR
Gennady Ivanovich Axenov
et al
BY Glascock, Downing, Seebold
ATTORNEY

Nov. 19, 1968  G. I. AXENOV ET AL  3,411,197
METHOD FOR CONTINUOUSLY MANUFACTURING COMMUTATOR SEGMENTS
Filed Nov. 26, 1963  3 Sheets-Sheet 3

INVENTOR
Gennady Ivanovich Axenov
et al
BY
ATTORNEY 3,411,197
METHOD FOR CONTINUOUSLY MANUFACTURING COMMUTATOR SEGMENTS
Gennady Ivanovich Axenov, Viktor Alexandrovich Soosanin, Vsevolod Leonidovich Belousov, Valentin Petrovich Reviakin, and Alexei Mikhailovich Sorokin, Kuibyshev, U.S.S.R., assignors to Kuibyshevsky Aviatsionny Institute, Kuibyshev, U.S.S.R.
Filed Nov. 26, 1963, Ser. No. 326,116
1 Claim. (Cl. 29—420)

ABSTRACT OF THE DISCLOSURE

This invention relates to a method for continuously manufacturing commutator segments by cold rolling three streams of metal powder, the middle stream being copper powder, and the two outer streams being steel powder, to form a unitary composite band which is rhombic in lateral cross section and has a uniform density. The band is then sintered by simultaneously hot compressing and calibrating it in a protective medium, and finally commutator segments are punched from the band so that the waste occurs in the steel edges.

---

The present invention relates to the art of commutator-type electric machines and, more particularly to a method for the manufacture of commutator segments.

Cold stamping of commutator segments from pure electrolytic copper rolled into a band which is trapezoidal in cross section is the method most widely used for manufacturing such segments. This method, however, possesses a number of essential drawbacks. Perhaps the most serious of such drawbacks are the considerable (over 20%) waste of material, the low production rate due to the fact that one working stroke of the press produces but one commutator segment; the use of complex and bulky equipment which occupies considerable floor space, the difficult labor conditions and the complicated system of transporting and handling the mechanisms involved.

It has been already proposed to make commutator segments by powder metallurgy, but the methods suggested to date have failed to find a practical application since such techniques involved the use of special automatic presses and complex press dies.

An important object of the present invention is to create a continuous-flow method for manufacturing commutator segments by the powder metallurgy technique which provides for a higher productivity of labor and which may be produced by comparatively simple equipment.

To accomplish the above and other objects and advantages, the invention is directed to a method of making commutator segments and comprises the steps of cold rolling powder streams having copper in the middle portion and steel along the edges, butt welding the same to each other to define a band rhombic in lateral cross section, sintering said band in a protective medium including simultaneous hot compression and calibration, and cooling and punching out the commutator segments from the band with a simultaneous cutting of two segments during a single stroke.

Figure 1:
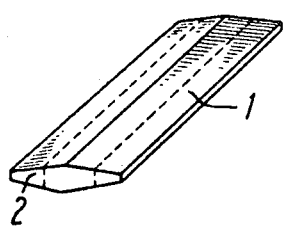
Figure 2:
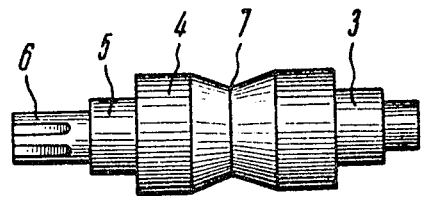
Figure 3:
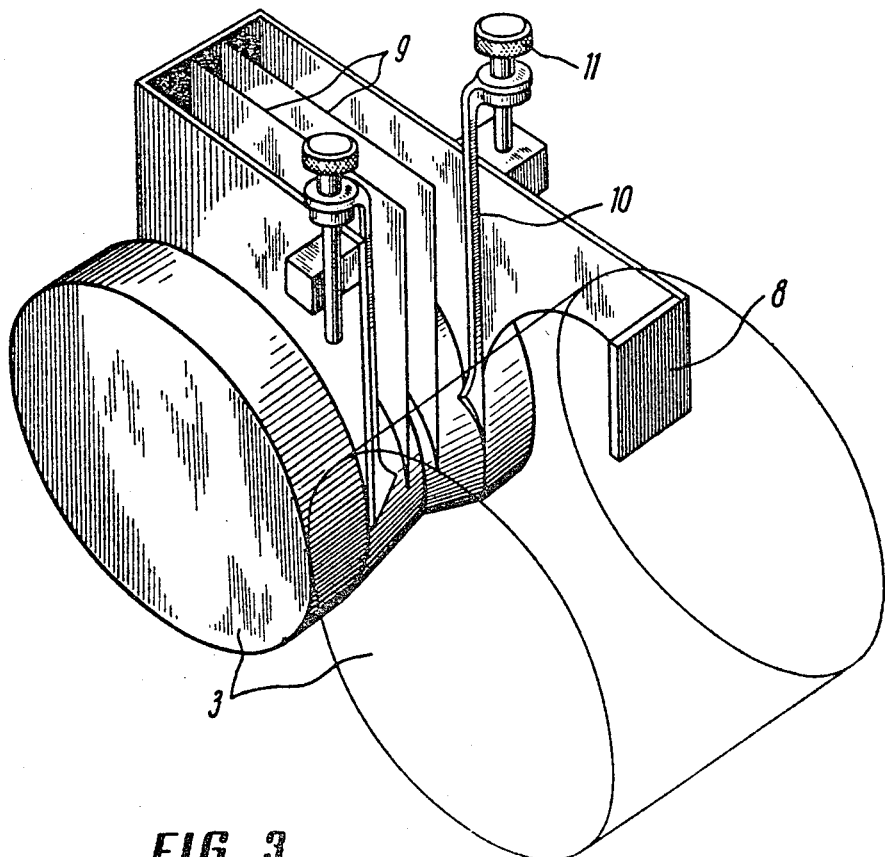
Figure 4:
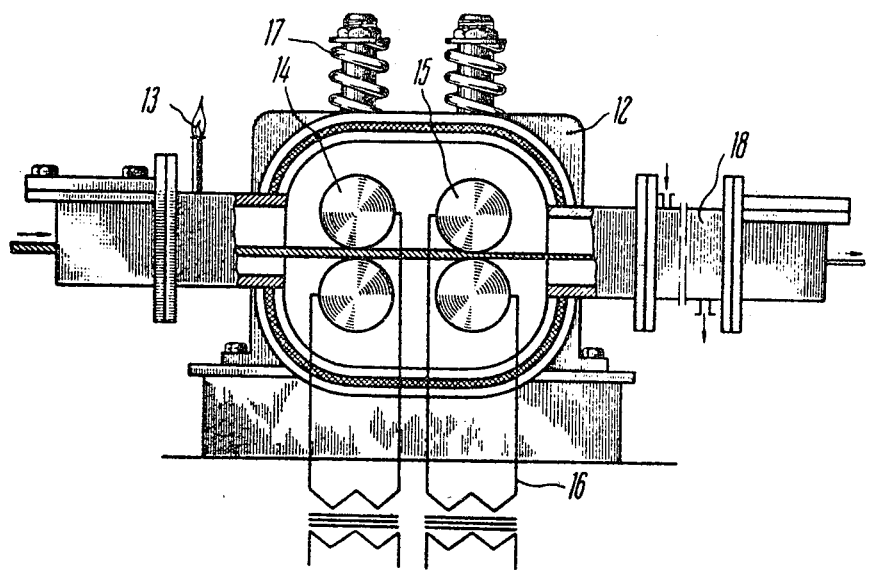
Figure 5:
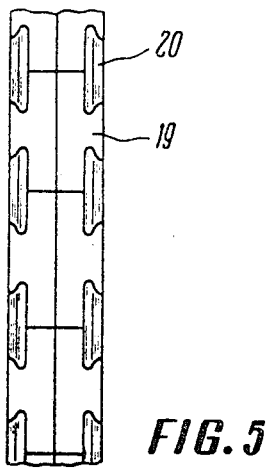
Figure 6:
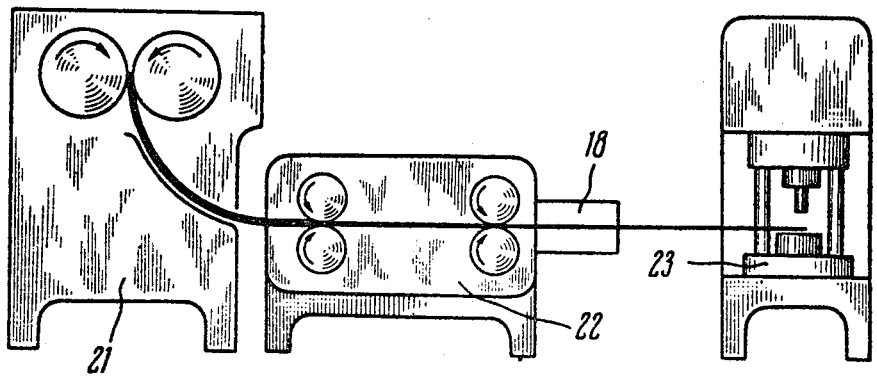

Additional objects and advantages of the invention will become more readily apparent to persons skilled in the art from the ensuing specification and annexed drawings and in which drawings:

FIGURE 1 is a view in perspective of a bimetal band from which the commutators are cut, FIGURE 2 is an elevational view of a roll of the mill for rolling the band to the shape required, FIGURE 3 is a view in perspective of the general arrangement of the mill, FIGURE 4 is a view partly in elevation and partly in cross section of a furnace in which the band illustrated in FIGURE 1 is sintered and compressed, FIGURE 5 is a fragmentary detailed view of the preferable configuration of the commutator segments cut from the band, and FIGURE 6 is a diagrammatic view of the assemblage for producing the commutator segments.

The first operation of the present method comprises rolling a diamond-shaped bimetal band from copper and iron powder. Edges 1 of the band are rolled from iron powder, and core or middle portion 2 from copper powder as shown in FIGURE 1.

The powders are rolled by means of rolls which do not differ from those used for conventional metal rolling. Each of such rolls denoted 3 (FIG. 2) is provided with a barrel or cylindrical part 4, neck 5 and journal 6. The barrel 4 has a part 7 machined to correspond to the shape of the band to be rolled with compression during subsequent operations which are taken into consideration.

A hopper 8 is mounted above the rolls 3 (FIG. 3). The hopper is designed so that no change in the distance between the rolls 3 should cause the formation of a gap between the hopper and the surface of the rolls to enable at least some of the powder to be spilled. The outer walls of the hopper are lapped to the surface of the barrel 4 of the roll 3 and partitions 9 are lapped to the surface of the part 7 within the hopper. The distance between the inner partitions 9 may be adjusted by means of set screws in order that a copper layer of the desired width may be produced.

The lowermost parts of the outer walls of the hopper and those of the partitions 9 are shaped to fit the roll periphery so as to ensure a sealing engagement between the surfaces. The partitions can be drawn apart without the sealing engagement between the same and the roll being adversely affected.

The central compartment of the hopper 8 is filled with copper powder which covers the whole area of deformation, and the side compartments are filled with steel powder. To manufacture a profiled band of uniform density along its entire width, the hopper is provided with limiters (batchers) 10 which control the supply of the powder to the deformation zone. The limiters are steel bars and such bars are approximately 1.5–2.0 mm. in thickness and 6 mm. in width. The lower part of each bar is cut at an angle which corresponds to the profile angle of the band to be rolled.

The limiters 10 by virtue of being raised and lowered by means of screws 11, means that the density through the band cross section can be equalized by the varying of the powder feed to the deformation zone.

The next operation resides in sintering the band made of bimetal powder, and such sintering step is combined with a simultaneous hot-compression rolling. The operation is performed in the electric continuous-action furnace in a protective atmosphere as shown in FIG. 4 and the band is compressed in the furnace to impart to the band metal hardness and sizing. As it is known, the process of sintering combined with compression proceeds considerably faster than non-compression sintering, since sintering under compression takes place due to the plastic flow of material.

Prior to initiating the operation of the furnace, the bimetal band is threaded thereinto. Labyrinth seals are provided at the locations where the band enters and leaves the furnace, namely at both ends of an air-tight muffle 12. The band threaded into the furnace is filled with a reducing medium such as hydrogen or converted natural gas. The gas flows in a direction opposite to the progress of the band and is ignited at the outlet of the furnace by a burner 13.

The reducing medium is supplied to the furnace, and rolls 14 and 15 located in the furnace are started simultaneously with the mill in which the band is rolled (FIG. 3). The rolls 14 and 15 have rotation imparted thereto by electric motors through special speed variators and reducing gears (not shown) which ensure accurate synchronization of the angular speeds of the rolls 3 of the mill and those of the rolls 14 and 15. The difference in angular speeds of the rolls of the mill and those of the furnace may lead to breakage of the non-sintered band. Electric current is supplied to rolls 14 and 15 from a transformer 16. The band is sintered while passing between the rolls 14 which exert but slight pressure and the pressure is adjusted by regulating the tension of compression springs 17.

When passing between the rolls 15, the gap between which rolls is pre-set according to the desired thickness of the band, heat and compression is imparted to the band. The compressed band passes through a water cooler 18 and is wound into a coil (not shown).

The third and last step of the method comprises stamping commutator segments from the sintered and compressed band. This step is performed at cutting two segments by one stroke on a conventional press. Due to this fact, the output of the press is doubled as illustrated in FIG. 5, in which numeral 19 denotes ready segments and numeral 20 steel waste.

All of the equipment required to manufacture commutator segments by the present invention may be easily assembled into a production line ensuring a continuity of production. The production line illustrated in FIG. 6 comprises a rolling mill 21, a furnace 22 in which the sintering and hot compressing operations are performed, the water cooler 18 and a press 23 for cutting the segments.

The invention is not to be confined to any strict conformity to the showings in the drawings but changes or modifications may be made therein so long as such modifications or changes mark no material departure from the spirit and scope of the appended claims.

What we claim is:

1. A method for continuously manufacturing commutator segments comprising the steps of providing three powder streams, the middle stream being copper powder and the two adjacent streams being steel powder; cold rolling said powder streams to form a unitary composite band, rhombic in lateral cross section and having a uniform density; simultaneously hot compressing and calibrating the band in a protective medium to sinter same; and punching the commutator segments from the sintered band so that the waste occurs in the steel edges.

References Cited

UNITED STATES PATENTS

| | | | |
|---|---|---|---|
| 2,028,233 | 1/1936 | Naeder | 29—420.5 |
| 2,341,732 | 2/1944 | Marvin | 29—420 |
| 2,925,337 | 2/1960 | Kalling et al. | 29—420.5 |
| 3,146,099 | 8/1964 | Teza | 29—420 |

JOHN F. CAMPBELL, *Primary Examiner.*

PAUL M. COHEN, *Assistant Examiner.*